US010216783B2

(12) United States Patent
Anderson et al.

(10) Patent No.: US 10,216,783 B2
(45) Date of Patent: Feb. 26, 2019

(54) SEGMENTING DATA WITH INCLUDED SEPARATORS

(71) Applicant: Microsoft Technology Licensing, LLC, Redmond, WA (US)

(72) Inventors: Jeffrey R. Anderson, West Fargo, ND (US); Sanket M. Vasa, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 14/504,673

(22) Filed: Oct. 2, 2014

(65) Prior Publication Data

US 2016/0098391 A1    Apr. 7, 2016

(51) Int. Cl.
G06F 17/30 (2006.01)
G06F 17/27 (2006.01)
G06F 8/41 (2018.01)

(52) U.S. Cl.
CPC ........ *G06F 17/30371* (2013.01); *G06F 8/427* (2013.01); *G06F 17/271* (2013.01); *G06F 17/2725* (2013.01)

(58) Field of Classification Search
CPC ............. G06F 17/30371; G06F 17/271; G06F 17/2725
USPC .................................................. 707/687, 693
See application file for complete search history.

(56) References Cited

U.S. PATENT DOCUMENTS 6,374,210 B1 * 4/2002 Chu .................... G06F 17/2863
704/9
6,564,214 B1 * 5/2003 Bhide ............... G06F 17/30985
7,076,731 B2 7/2006 Brill et al.
7,503,486 B2 3/2009 Ahles et al.
7,546,261 B2 6/2009 Bogosian et al.
7,788,313 B2 8/2010 Vicknair et al.
8,171,462 B2 5/2012 Ahs et al.
8,341,081 B1 12/2012 Wang et al.
8,374,986 B2 2/2013 Indeck et al.
8,600,736 B2 12/2013 Ball
2006/0059440 A1 * 3/2006 Pry ................... G06F 17/30864
715/838

(Continued)

FOREIGN PATENT DOCUMENTS

WO    WO 98/48360 A1    10/1998

OTHER PUBLICATIONS

"Planning and Defining Key Flexfields", Published on: Dec. 2, 2011 Available at: http://docs.oracle.com/cd/E18727_01/doc.121/e12892/T354897T361275.htm.

(Continued)

*Primary Examiner* — Thu Nguyet T Le
(74) *Attorney, Agent, or Firm* — Christopher R. Christenson; Kelly, Holt & Christenson PLLC

(57) ABSTRACT

An incoming string is received and an initial segmentation is generated based upon separators in the incoming string. The segment values in the initial segmentation are validated by determining whether they are found in a data store. Where a segment in the initial segmentation is not found, subsequent segments, and corresponding separators, are iteratively concatenated to find segment values. Where a segment is still not found, after iterative concatenation, the initial segment in the concatenation is output as an unfound segment and the subsequent segments are processed further.

10 Claims, 9 Drawing Sheets

(56) References Cited

U.S. PATENT DOCUMENTS

2010/0318926 A1  12/2010  Anderson et al.
2012/0151411 A1  6/2012  Schwartz et al.

OTHER PUBLICATIONS

"Segmented Entry [AX 2012]", Published on: Dec. 11, 2011 Available at: http://msdn.microsoft.com/en-us/library/hh300646.aspx.
Second Written Opinion for International Patent Application No. PCT/US2015/051860, dated Apr. 8, 2016, date of filing: Sep. 24, 2015, 4 pages.
International Preliminary Report on Patentability for International Patent Application No. PCT/US2015/051860, dated Jun. 20, 2016, date of filing: Sep. 24, 2015, 7 pages.
International Search Report and Written Opinion for International Application No. PCT/US2015/051860, dated Dec. 2, 2015, date of filing: Sep. 24, 2015, 12 pages.

* cited by examiner

SEGMENTING DATA WITH INCLUDED SEPARATORS

BACKGROUND

Computer systems are currently in wide use. Some such computer systems enable a user to provide data entry in the form of a string of characters. Some data that is entered can be segmented data, meaning that the data contains multiple different segments that are provided according to a structured format. One example format is a set of discrete values, each of which is a string.

For instance, some computer systems include business systems. Business systems can include customer relations management (CRM) systems, enterprise resource planning (ERP) systems, line-of-business (LOB) systems, among others. These systems often have business data records which correspond to items in the business system. For instance, a record may correspond to a customer account, a vendor account, a product, or a wide variety of other things.

Each of the items may be represented by a number. For instance, a customer account may be identified by an account number. A vendor account may be identified by a vendor account number. A product may be identified by a product number, etc.

The numbers are often segmented to indicate different variations. For instance, a customer account number may have a main account segment that identifies the customer in general. It may also have a division account segment that identifies a particular division of the customer, a business unit account segment that identifies a particular business unit, a project segment that identifies a particular project, etc. The same can be true of other segmented information that can be entered. This type of information is referred to as segmented data.

When a business system receives an incoming string that is expected to be in a segmented data format, it often parses the incoming string to identify the individual segments, and segment values. One way of doing this is to separate the string based upon recognized separators that are included in the string and to treat groups of characters between separators as a discrete segment value. One example of a separator is a hyphen. However, this is only one example and computer system often identify a wide variety of different types of characters as separators.

Some computer systems also allow segment values to include a separator character. For instance, where a computer system recognizes a hyphen as a separator, the computer system may also allow a user to include the hyphen within a segment, as part of the segment value.

The discussion above is merely provided for general background information and is not intended to be used as an aid in determining the scope of the claimed subject matter.

SUMMARY

An incoming string is received and an initial segmentation is generated based upon separators in the incoming string. The segment values in the initial segmentation are validated by determining whether they are found in a data store. Where a segment in the initial segmentation is not found, subsequent segments, and corresponding separators, are iteratively concatenated to find segment values. Where a segment is still not found, after iterative concatenation, the initial segment in the concatenation is output as an unfound segment and the subsequent segments are processed further.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion will proceed with a description of the computer system being a business system. However, it will be appreciated that the computer system can be a wide variety of other computer systems as well. For instance, it can be any computer system that receives an input string that corresponds to segmented data, and that performs data segmentation on the input string to identify the segment structure of the data, and to identify the individual segment values in the segments found in the data structure. Such systems can be those that process part numbers or product numbers that are provided as segmented data, bank account systems that process bank accounts that are provided as segmented data, etc. Thus, describing the system as a business system is done for the sake of example only.

Figure 1:
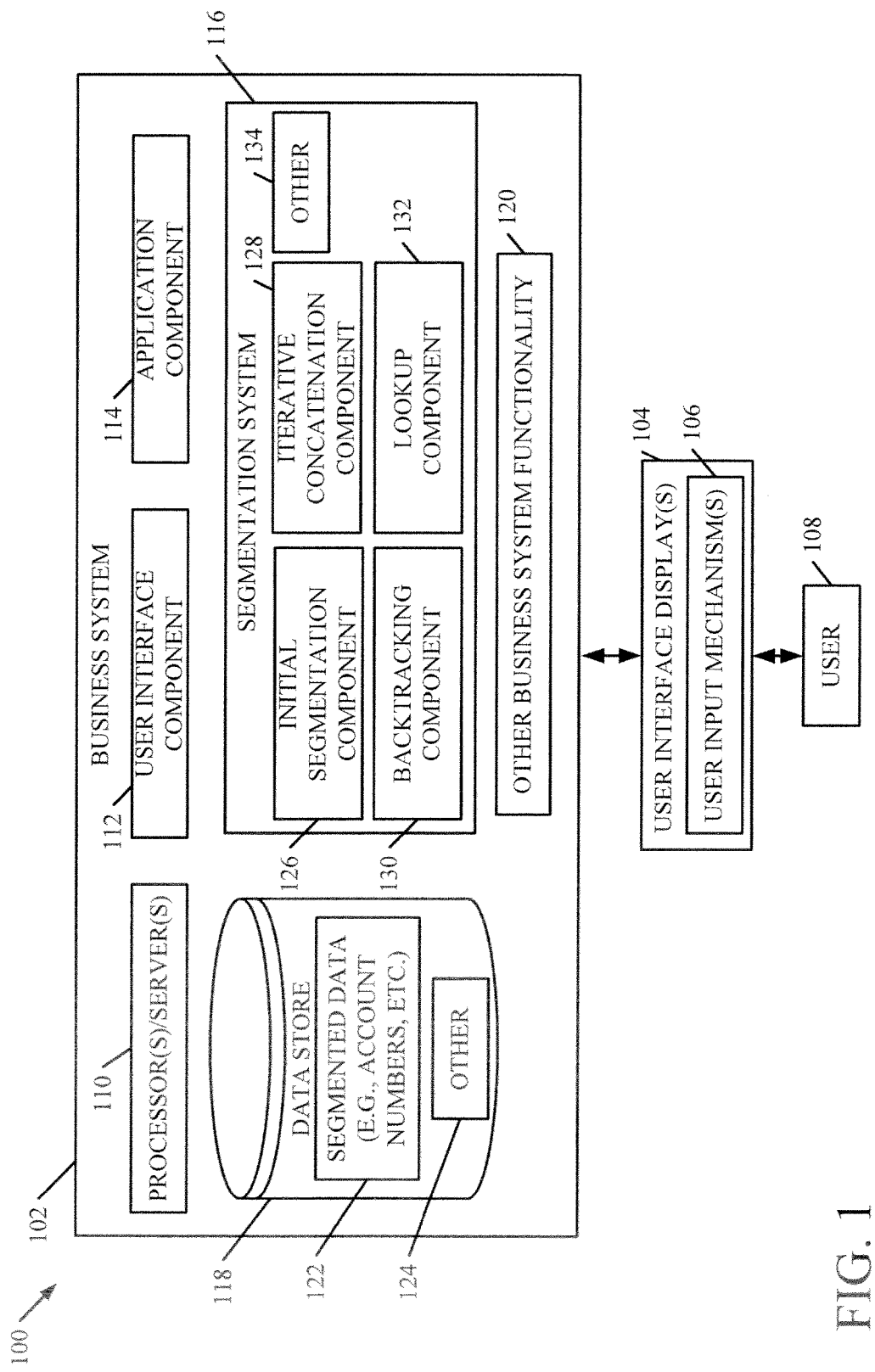
FIG. 1 is a block diagram of one example of a data segmentation architecture.

FIG. 1 is a block diagram of one example of a data segmentation architecture 100. Architecture 100 illustratively includes business system 102 that generates user interface displays 104, with user input mechanisms 106 for interaction by user 108. User 108 illustratively interacts with the user input mechanisms 106 in order to control and manipulate business system 102. In one example, the user interface displays 104 include data entry user input mechanisms that allow user 108 to enter a data string that represents segmented data. This is described in greater detail below.

Business system 102 illustratively includes processors or servers 110, user interface component 112, application component 114, segmentation system 116, and data store 118. It can also include a wide variety of other business system functionality 120.

Data store 118, itself, illustratively includes segmented data 122 (such as account numbers, part numbers, etc.) and it can include a wide variety of other business data 124. Segmentation system 116 illustratively includes initial segmentation component 126, iterative concatenation component 128, backtracking component 130, lookup component 132, and it can include other items 134 as well.

Before describing the overall operation of architecture 100 in performing data segmentation, a brief overview of some of the items in architecture 100, and their corresponding operation, will first be provided. User interface component 112 illustratively generates (either under the control of other items, or by itself) user interface displays 104 and processes inputs through user input mechanisms 106. Application component 114 illustratively runs applications that operate on business data in data store 118 to perform processes, or allow user 108 to perform tasks or activities in order to carry out his or her job functions with respect to the organization that uses business system 102. The applications can include general ledger applications or a wide variety of other accounting applications, inventory processing or inventory control applications, opportunity tracking applications, project management applications, etc. Business system functionality 120 illustratively provides the functionality that is used by user 108 in order to run the applications and perform his or her tasks or activities.

Segmentation system 116 receives a data string through user input mechanisms 106 and parses that information to identify a segmentation structure in that information, and to identify individual segment values for the segments in the identified segment structure. The segment values can be provided to application component 114, business system functionality 120, or other items, to be used in business system 102.

Figure 2A:
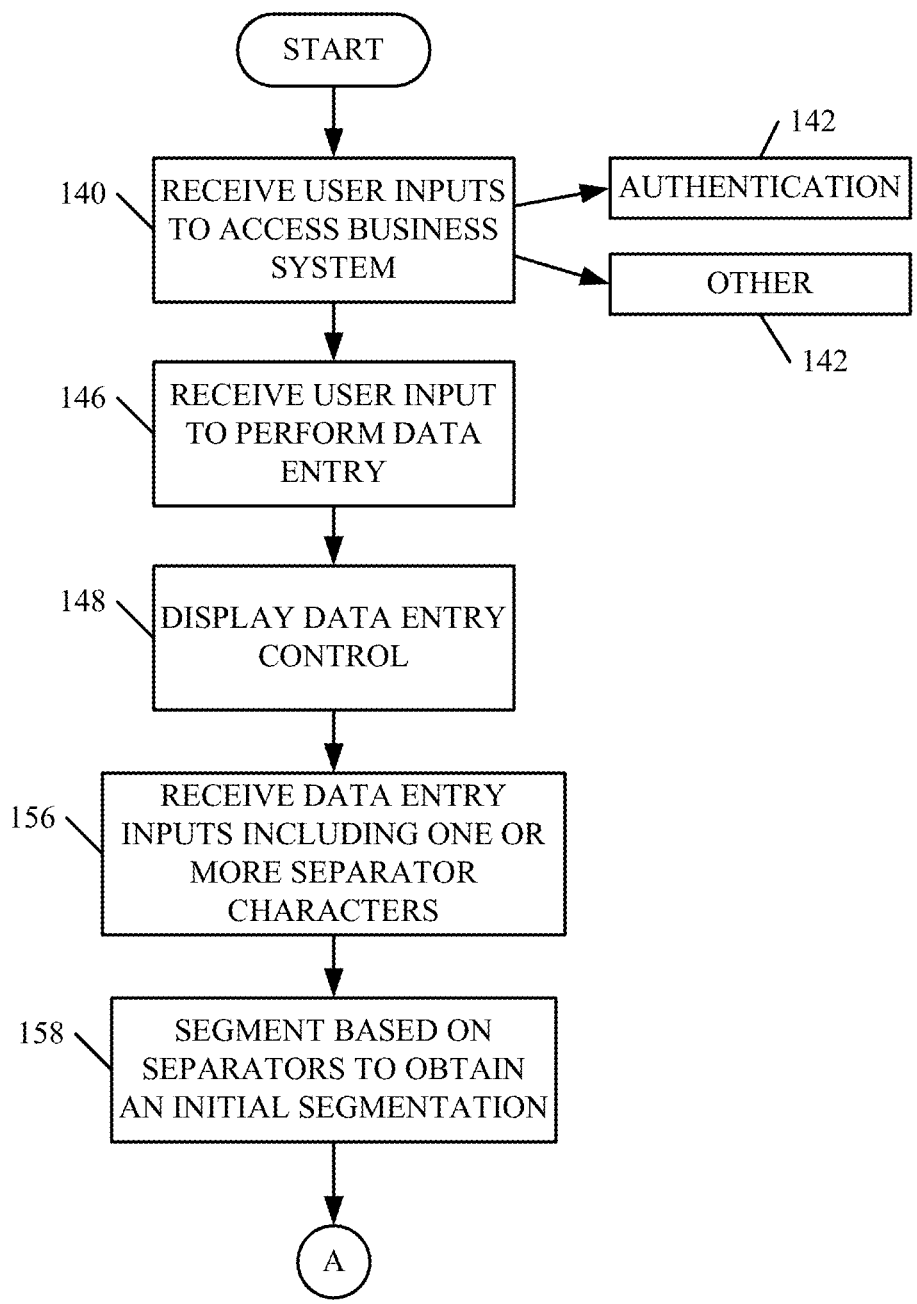
FIGS. 2A and 2B (collectively referred to herein as FIG. 2) show a flow diagram illustrating one example of the operation of the architecture shown in FIG. 1, in segmenting an input string.
Figure 2B:
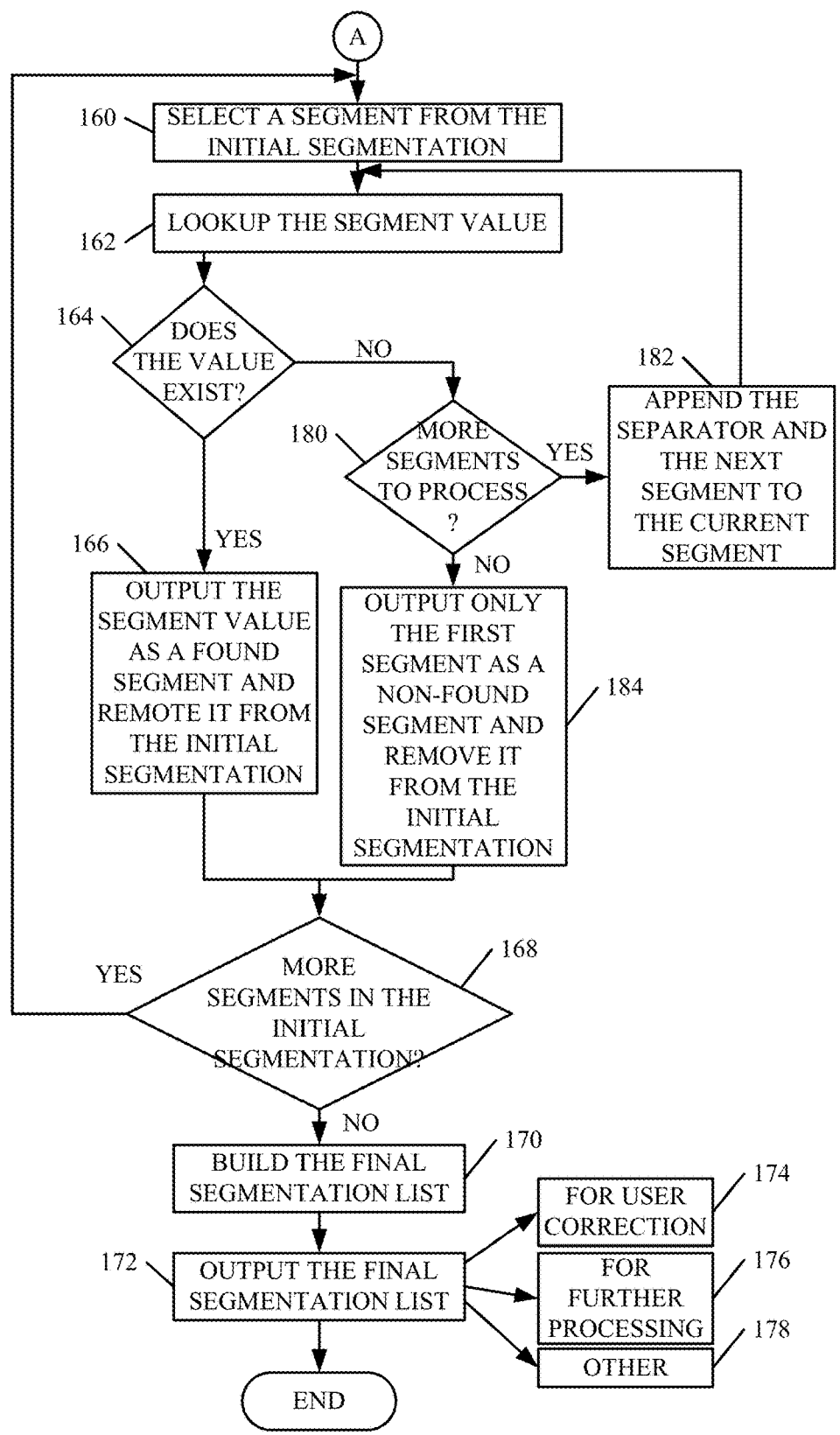
Figure 3:
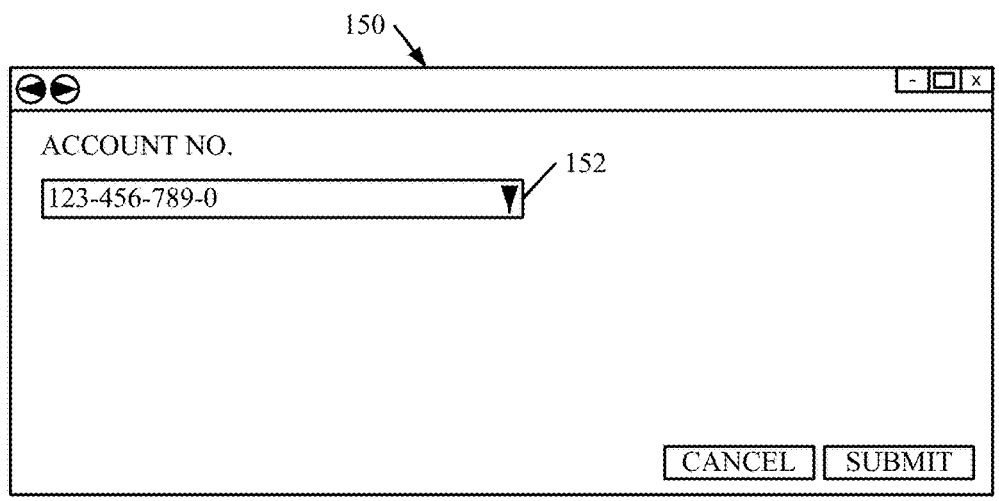
FIG. 3 shows one example of a user interface display.

FIGS. 2A and 2B (collectively referred to herein as FIG. 2) show a flow diagram illustrating one example of the operation of segmentation system 116 in segmenting an incoming data string. FIG. 3 shows one example of a user interface display that can be used by user 108 in order to input the data string. FIGS. 1-3 will now be described in conjunction with one another. In the present example, it is assumed that business system 102 recognizes the hyphen character as a separator between segments. However, it is also assumed that business system 102 allows the user to use the hyphen character as part of a discrete segment value within any given segment.

It is first assumed that user 108 provides an input indicating that user 108 wishes to access business system 102. This is indicated by block 140 in FIG. 2. For instance, user 108 can provide authentication information 142 or a wide variety of other user inputs 144 that indicate this.

User 108 then provides user inputs indicating that user 108 wishes to perform some type of data entry. This is indicated by block 146. In response, business system 102 generates a user interface display 104, with a user input mechanism 106 that allows the user 108 to enter information. Displaying such a data entry control is indicated by block 148 in FIG. 2.

FIG. 3 shows one example of such a data entry control on a user interface display 150. It can be seen that the user is prompted to enter an account number into text box 152. FIG. 3 shows that the user has entered the character string 123-456-789-0 into text box 152. Receiving data entry inputs of a character string that includes at least one separator character is indicated by block 156 in the flow diagram of FIG. 2. As an overview, this information will illustratively be provided to segmentation system 116 which is expecting a character string that represents segmented data. Segmentation system 116 illustratively identifies a segmentation value, that includes a segmentation structure and individual segment values, from the input string. The segmentation structure will indicate a number of individual segments in the string. The individual segment values will be the segment values for each of the segments in the segmentation structure. It then validates the segmentation value against the segmented data 122 of data store 118.

It can be seen that there are a variety of different possible segmentations of the character string input as shown in FIG. 3. Based upon the input character string, there are eight different possible segmentations (e.g., there are eight different ways that the input string can be segmented). These eight different ways include anywhere from one to four different segments, as follows (where a comma in the list below indicates a separation between segments):

123-456-789-0 (i.e., it is all one segment)
123-456-789,0 (i.e., it is two segments)
123-456,789-0 (two segments)
123-456,789,0 (three segments)
123,456-789-0 (two segments)
123,456-789,0 (three segments)
123,456,789-0 (three segments)
123,456,789,0. (four segments)

In a great many cases, a given segment does not contain a separator. Therefore, it may be that a most likely segmentation in the example above is the last segmentation 123,456,789,0. Therefore, when attempting to segment the string input by user 108, initial segmentation component 126 in segmentation system 116 segments the string into a segment structure based upon the separator characters (in this case, the hyphens). It thus obtains an initial segmentation value as the last segmentation in the list above (that is, 123,456,789,0). The segmentation structure is four segments and the segment values are the values in each segment. Segmenting the input string based on the separators to obtain the initial segmentation value is indicated by block 158 in the flow diagram of FIG. 2.

Lookup component 132 then begins to validate the initial segmentation by looking up each segment value, in order. Thus, it selects a first segment in the initial segmentation, as indicated by block 160, it then looks up that segment value in data store 118, as indicated by block 162.

If the segment value is found in data store 118, it is output as a found segment. It is then removed from the initial segmentation. This is indicated by blocks 164 and 166 in FIG. 2.

It then determines whether more segments in the initial segmentation have yet to be processed. This is indicated by block 168. If so, processing reverts to block 160 where the next segment is selected and looked up (at block 162). The next segment will be found to exist, and it will be output as a found segment and removed from the initial segmentation. This continues until all the segments in the initial segmentation have been processed.

Processing then continues at block 170 where the final segmentation list is generated and output, as indicated by block 172. If errors exist in the final segmentation (as described below), the final segmentation can be output for user correction as indicated by block 174. The final segmentation can also be output to other business system functionality 120 for further processing. This is indicated by block 176. The final segmentation can be output in other ways as well, as indicated by block 178.

Now consider the scenario where one of the separators in the input string shown in FIG. 3 is actually part of a valid segment value. For instance, consider the scenario where the proper segmentation is 123,456-789,0. It can be seen that the hyphen in the second segment is part of the segment value, instead of a segment separator. In this case, the input string will, again, first be separated into the initial segmentation based on the separator characters. Thus, the initial segmentation will again be 123, 456, 789, 0. Then, the first segment (123) will be selected from the initial segmentation at block 160, looked up at block 162, found to exist at block 164 and output as a found segment at block 166 and then removed from the initial segmentation.

The process will revert to block 160 where the next segment in the initial segmentation, 456, is selected. It has been found that when a segment value contains a separator character, the two portions of the segment value separated by that character are very unlikely to be valid values, by themselves. Therefore, when lookup component 132 looks up the segment value 456, it does not find that value at block 164. At this point, iterative concatenation component 128 determines whether there are any more segments to process in the initial segmentation. This is indicated by block 180. Using the example being discussed, there are more segments to process (the segments 789 and 0). Thus, iterative concatenation component 128 appends the next separator character and the next segment to the currently selected segment. This is indicated by block 182.

That is, iterative concatenation component 128 will generate a concatenated segment value "456-789". Processing returns to block 162 where lookup component 132 looks up concatenated segment value "456-789" in segmented data 122 in data store 118 to see whether it exists. If the concatenated value does exist (at block 164), then this value (456-789) is output as the second segment and that entire string is removed from the initial segmentation.

Iterative concatenation component 128 then determines whether there are more segments to process in the initial segmentation. It can be seen that there is an additional segment (0) in the initial segmentation. Therefore, processing again reverts to block 160 where that segment is selected and looked up (at block 162). It will be found to exist at block 164 and it is output as a found segment. There are no more segments to consider at block 168, thus the final and correct segmentation is output as 123,456-789,0.

The segmentation system 116, however, includes back tracking component 130. Component 130 allows segments to be unfound, such as where they are mistyped or otherwise erroneously entered but where the other segments are still found.

For instance, assume that the user has typed "1X3-456-789-0". Assume further that the segment value 1X3 does not exist in segmented data 122 and is therefore invalid. Backtracking component 130 illustratively allows for this, while still finding the other valid segments. Using the processing discussed above, initial segmentation system 116 generates the initial segmentation as 1X3,456,789,0. Assume that the actual segmentation is 123,456-789,0. Again, using the processing described above, initial segmentation component 126 and iterative concatenation component 128 will search for the following segmentation values, in order:

1X3
1X3-456
1X3-456-789
1X3-456-789-0.

At this point, it will not have found a matching value for any of these, because the first segmentation value (1X3) does not exist and because no segment combinations exist with a value of 1X3 (they are not valid segment values). Processing will thus have arrived at block 180, where no more segments in the initial segmentation exist to process. Thus, backtracking component 130 will illustratively output only the first segment as a non-found segment, and it will remove only the first segment from the initial segmentation. This is indicated by block 184 in FIG. 2.

Processing will then continue at block 168 where segmentation system 116 will determine whether there are any more (non-removed) segments in the initial segmentation.

Of course, there are, and those segments include 456,789,0. Execution will then proceed as discussed above where segmentation system 116 will first search for the segment 456, and will not find it. Iterative concatenation component 128 will then concatenate the subsequent segment and its separator to obtain "456-789" and lookup component 132 will search for, and find, that value. Finally, the third segment "0" will be found as well.

The result will thus have a correct segmentation structure of 1X3,456-789,0, even though not all of the segment values were found. Therefore, the segmentation value can be output, while flagging the first segment in the segmentation value as being unfound (e.g., as containing an error). User 108 can then quickly identify the particular segment that contains the error, fix it, and resubmit the string for processing.

In one example, because one of the initial segments has changed, the segmentation structure to the right of that segment may change. Therefore, in this example, when the user corrects a segment value, all of the segments to the right of the corrected segment are reprocessed.

It can thus be seen that the present description provides significant technical advantages. For instance, it improves the processing of the business system 102, itself. Instead of searching for all possible segmentation combinations, the present description proceeds by making an initial segmentation based upon separator characters. This is very often a correct segmentation and therefore the segmentation process goes much more quickly and consumes far less computing and memory overhead.

In addition, where a segment value is found, it is output as a found value and the system searches for the segment values to the right of that segment. If any segments are not found, the iterative concatenation is performed only on segments to the right of already-found segments, so the segments that have already been found need not be reprocessed. Again, this leads to significant reductions in processing and memory overhead that is used by the segmentation system.

The present description also allows segment values to include separator characters but still efficiently determines the intended segmentation. It does this while still allowing for instances where a given segment was mistyped or otherwise entered in error, and no matching values are found. This improves the flexibility of the system 102 in allowing separator characters to be part of segment values, it also improves the processing speed and efficiency of system 102, because it need not iteratively search for all possible segmentation combinations. Further, it greatly improves the user experience, because it allows the user to quickly and easily enter segmented data, and to easily spot and correct errors in the segmented data. It does not force the user into some form of explicit segmentation in the case where a separator is part of a segment value. This is automatically identified and validated in the system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
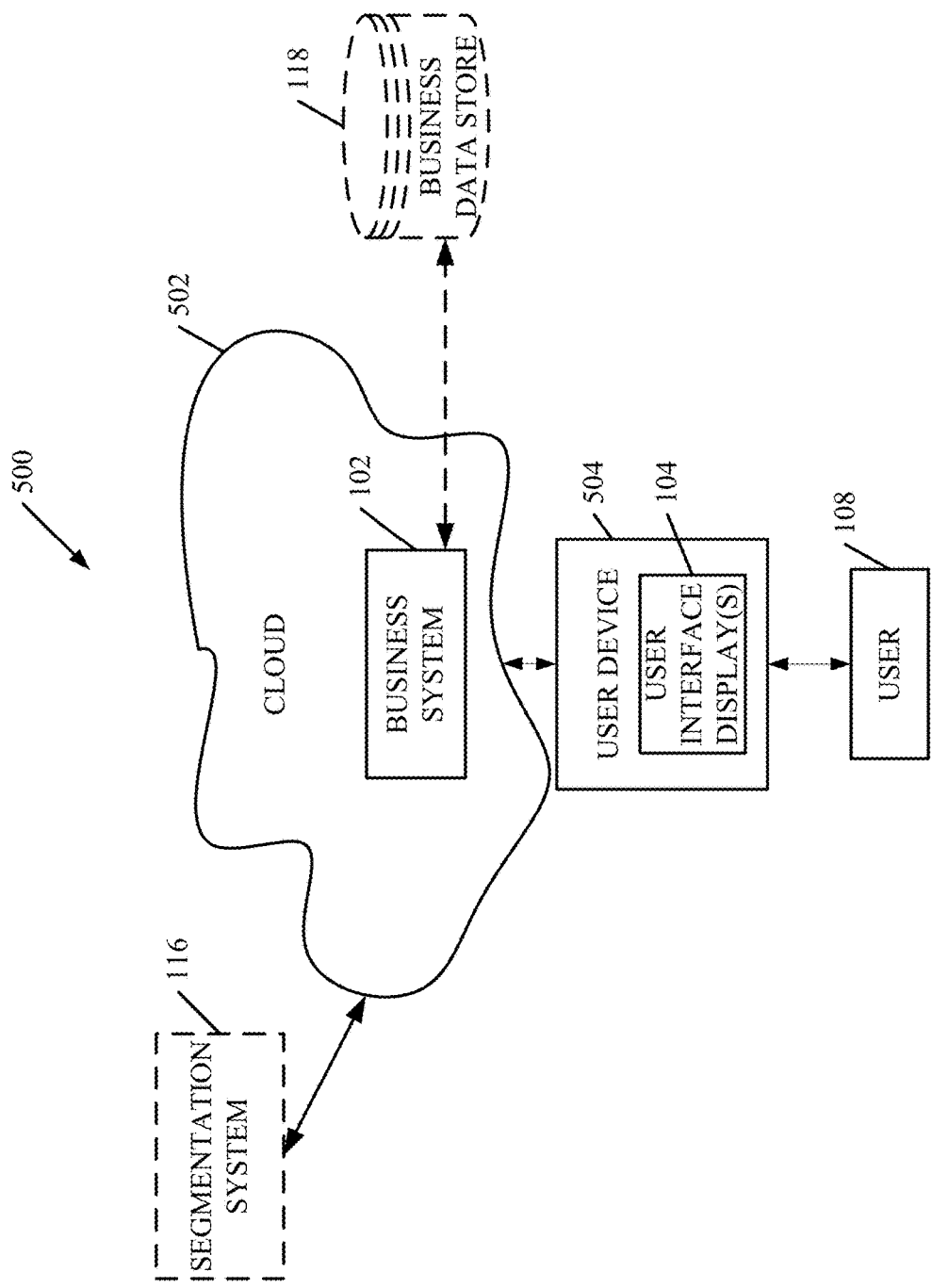
FIG. 4 is a block diagram of one example of the architecture shown in FIG. 1, deployed in a cloud computing architecture.

FIG. 4 is a block diagram of architecture 100, shown in FIG. 1, except that, in the example shown in FIG. 4, its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that business system 102 can be located in cloud 502 (which can be public, private, or a combination where portions are public while others are private). Therefore, user 108 uses a user device 504 (such as one that includes a client system) to access those systems through cloud 502.

FIG. 4 also depicts another example of a cloud architecture. FIG. 4 shows that it is also contemplated that some elements of business system 102 are disposed in cloud 502 while others are not. By way of example, data store 118 can be disposed outside of cloud 502, and accessed through cloud 502. In another example, segmentation system 116 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
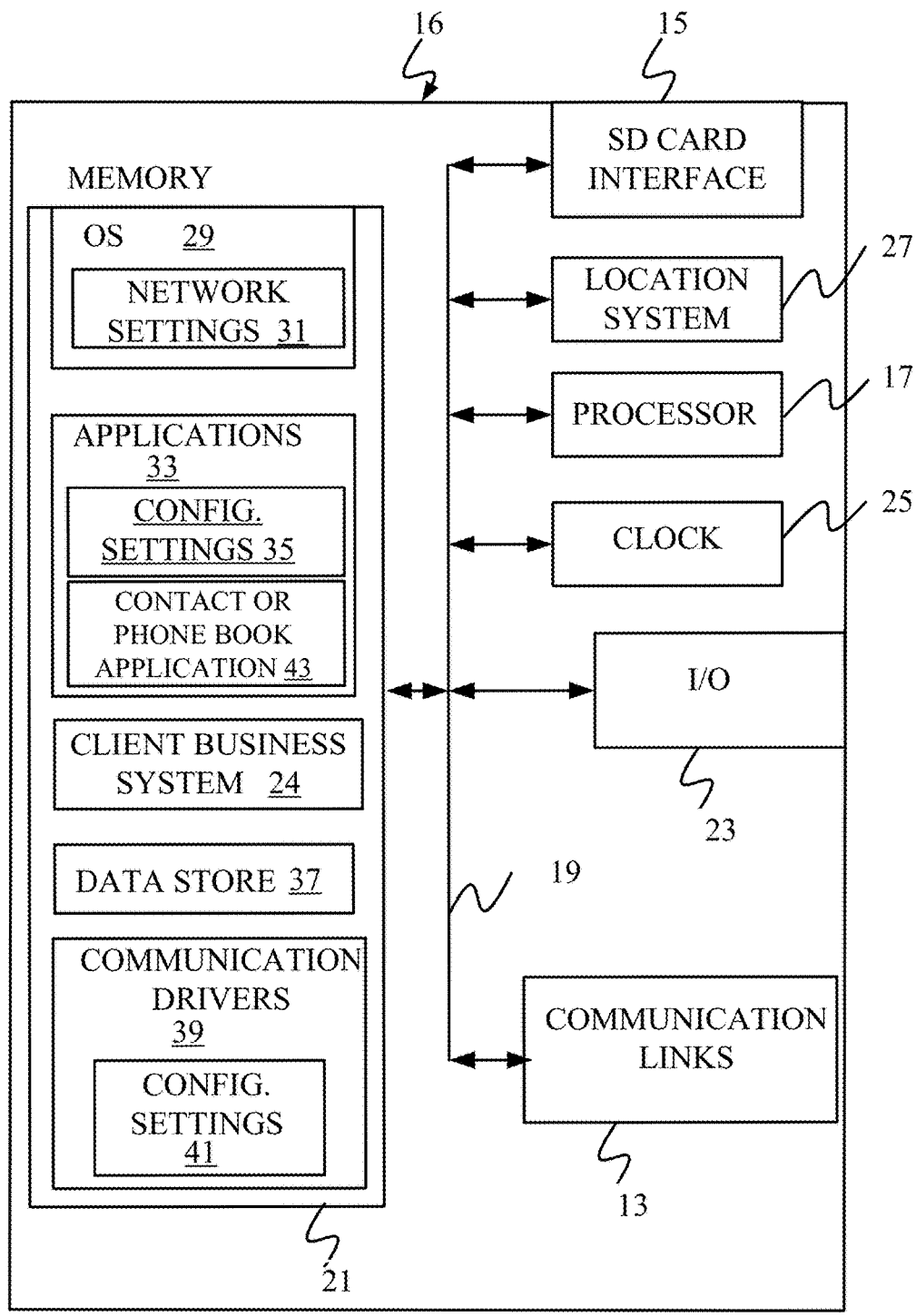
FIGS. 5-7 show various examples of mobile devices.
Figure 6:
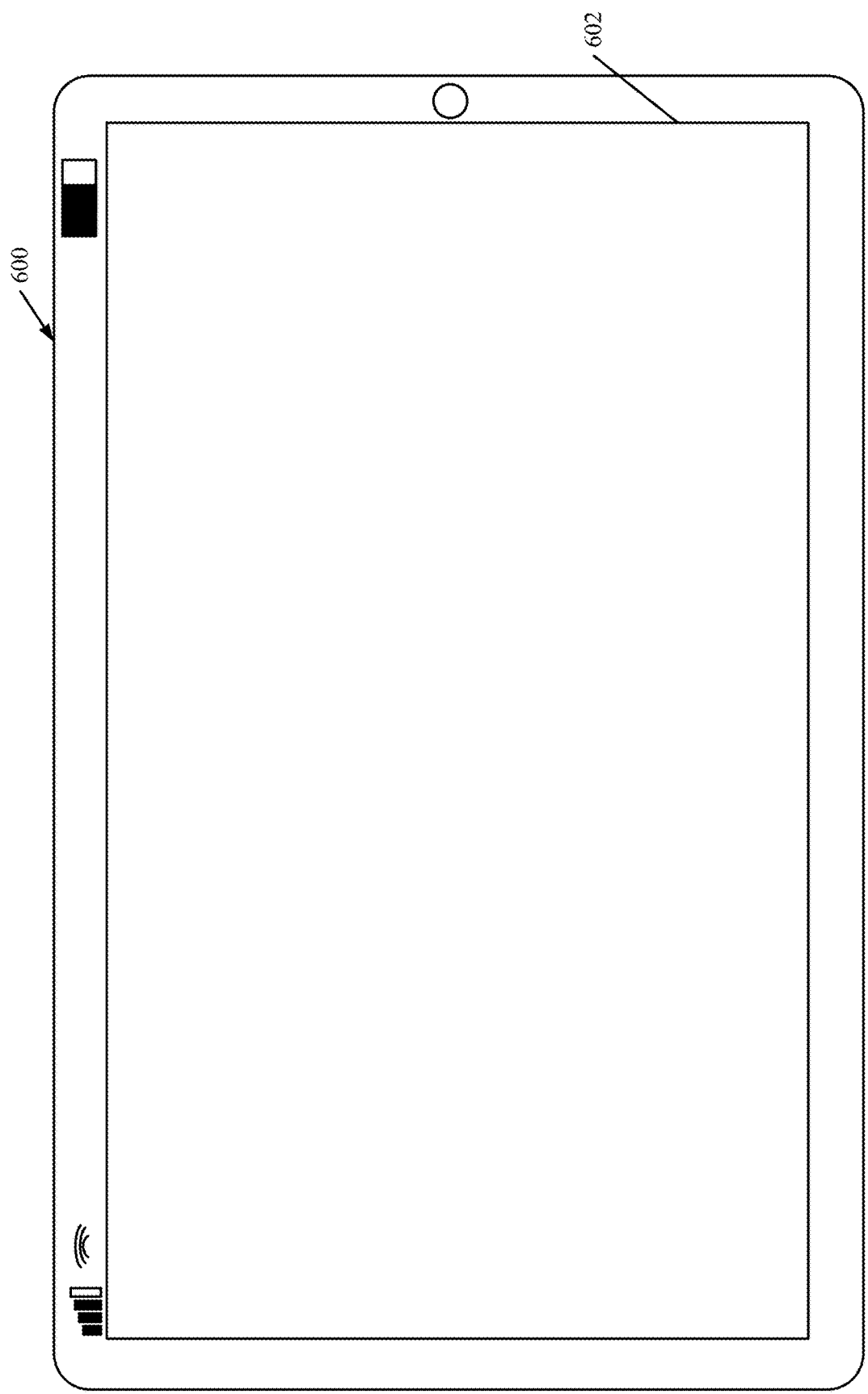
Figure 7:
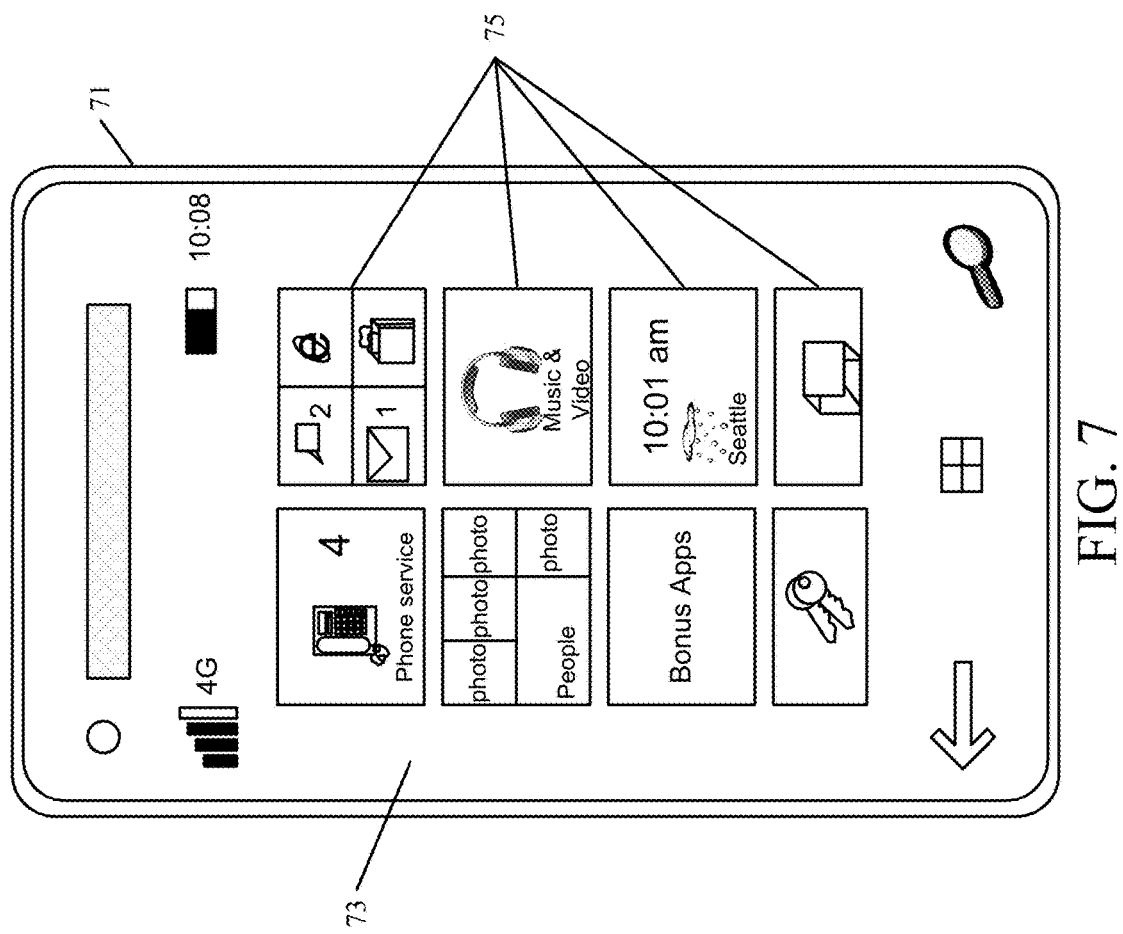

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 110 from FIG. 1 or those on user device 504 from FIG. 4) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the phone also includes a Secure Digital (SD) card slot that accepts a SD card.

The mobile device can also be a personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
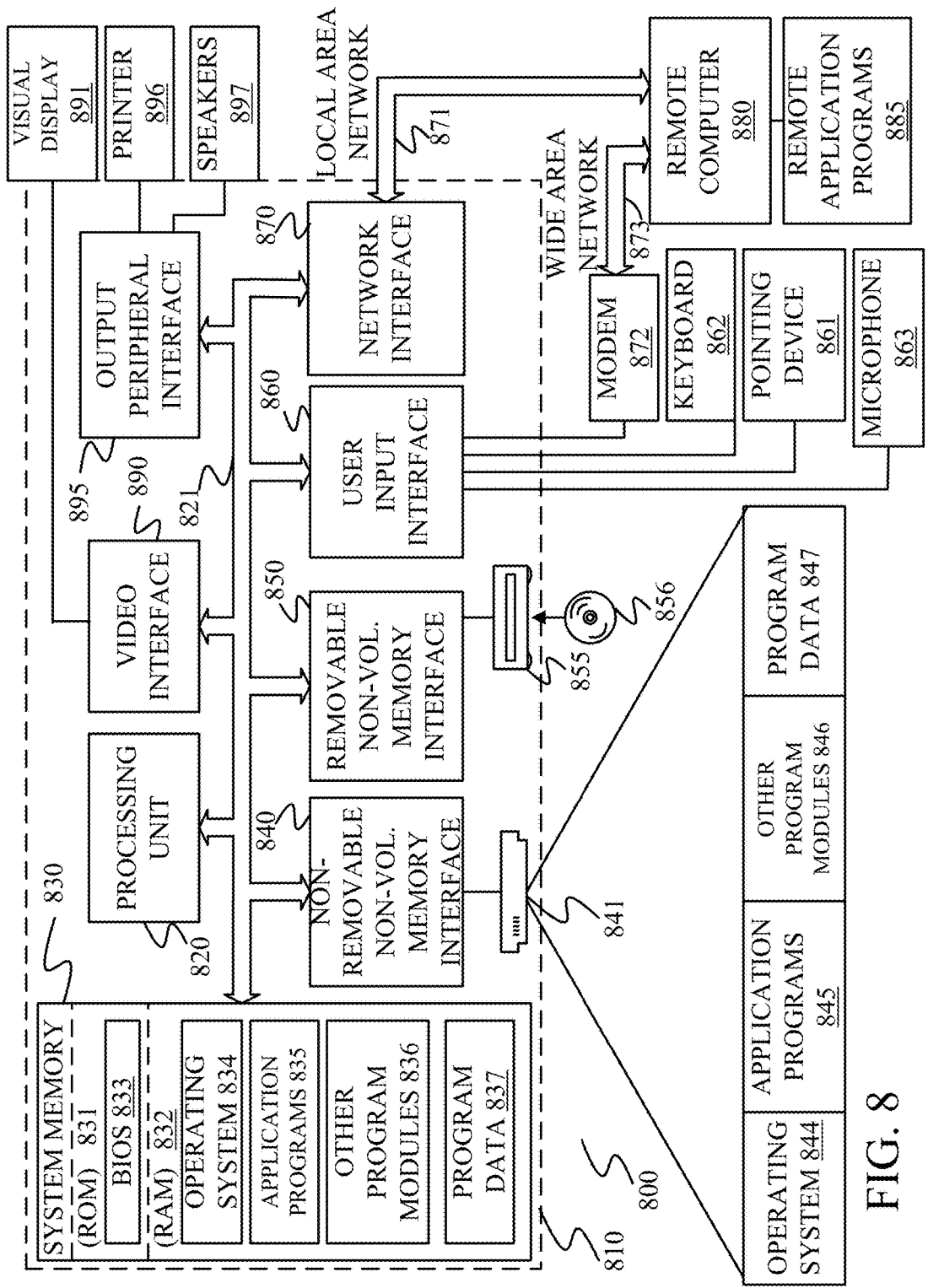
FIG. 8 is a block diagram of one example of a computing environment that can be used in the architectures of FIGS. 1 and 4.

FIG. 8 is one embodiment of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processor 110 or those in user device 504), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a method, comprising:

segmenting a string of characters into an initial segmentation of segments with corresponding segment values based on a set of separator characters in the string of characters;

validating a first remaining segment value in the initial segmentation to identify it as found or unfound;

if the first remaining segment value is identified as unfound, repeatedly generating a concatenated segment value from the first remaining segment values and subsequent remaining segment value and validating the concatenated segment value; and if the first remaining segment value or the concatenated segment value are identified as found, removing them from the initial segmentation; and repeating the steps of validating, generating a concatenated segment value and removing, until there are no more remaining segment values in the initial segmentation.

Example 2 is the method of any or all previous examples wherein repeatedly generating a concatenated segment value comprises:

concatenating a next subsequent remaining segment value from the initial segmentation, and a corresponding separator character, to the first remaining segment value, to obtain a concatenated segment value;

validating the concatenated segment value to identify the concatenated segment value as found or unfound; and repeating the steps of concatenating and validating until either the concatenated segment value is identified as found or the remaining segment values in the initial segmentation have all been concatenated.

Example 3 is the method of any or all previous examples and further comprising:

if the remaining segment values in the initial segmentation have all been concatenated to the concatenated segment value, and the concatenated segment value is identified as unfound, then identifying only the first remaining segment value in the concatenated segment value as unfound and removing only the first remaining segment value in the concatenated segment value from the initial segmentation.

Example 4 is the method of any or all previous examples and further comprising:

generating an output segmentation indicating a segment structure of output segments and corresponding segment values; and indicating whether any segment values in the output segmentation are identified as unfound.

Example 5 is the method of any or all previous examples and further comprising:

receiving a revised segmentation in which a segment in the output segmentation has been modified; and validating only segments in the revised segmentation that are subsequent to the modified segment in the output segmentation, to obtain a final segmentation.

Example 6 is the method of any or all previous examples and further comprising:

generating a data entry user input mechanism in a business system; and receiving the string of characters input through the data entry user input mechanism.

Example 7 is the method of any or all previous examples wherein segmenting the string of characters into the initial segmentation comprises:

dividing the string of characters into a plurality of segments at segment boundaries identified by the separator characters in the string of characters.

Example 8 is the method of any or all previous examples wherein validating comprises:

looking up the segment value in a business system data store to identify whether the segment value is found or unfound in the business system data store.

Example 9 is a computing system, comprising:

an initial segmentation component configured to receive a string of characters and generate an initial segmentation value, having segments with corresponding segment values, based on separator characters in the string;

a lookup component configured validate the segment values and identify the corresponding segments as valid or invalid based on the validation; and a concatenation component configured to, for an invalid segment, iteratively concatenate remaining segments and separators from the initial segmentation value to obtain a concatenated segment value, and provide the concatenated segment value to the lookup component for validation, until either the concatenated segment value is identified as valid or all of the remaining segments in the initial segmentation value have been concatenated.

Example 10 is the computing system of any or all previous examples wherein the lookup component is configured to remove valid segments and valid concatenated segment values from the initial segmentation value to leave the remaining segments in the initial segmentation value.

Example 11 is the computing system of any or all previous examples and further comprising:

a backtracking component configured to obtain the concatenated segment value, when the concatenated segment value is identified as invalid and when the remaining segments have all been concatenated to the concatenated segment value, and to identify only the first segment in the concatenated segment value as invalid and remove only the first segment in the concatenated segment value from the initial segmentation value.

Example 12 is the computing system of any or all previous examples wherein the initial segmentation component is configured to generate the initial segmentation value by dividing the string of characters into a plurality of segments at segment boundaries identified by the separator characters in the string of characters.

Example 13 is the computing system of any or all previous examples wherein the lookup component is configured to validate the segment values by looking up the segment values in a business system data store to identify whether the segment values are found or unfound in the business system data store.

Example 14 is the computing system of any or all previous examples wherein the lookup component is configured to generate an output segmentation indicating a segment structure of output segments and corresponding segment values and indicating whether any segment values in the output segmentation are identified as unfound.

Example 15 is a computer readable storage medium storing computer executable instructions which, when executed by a computer, cause the computer to perform a method, comprising:

validating a first remaining segment value in an initial segmentation of characters in a character string to identify it as found or unfound;

if the first remaining segment value is identified as unfound generating a concatenated segment value by:

concatenating a next subsequent remaining segment value from the initial segmentation, and a corresponding separator character, to the first remaining segment value, to obtain a concatenated segment value;

validating the concatenated segment value to identify the concatenated segment value as found or unfound; and repeating the steps of concatenating and validating until either the concatenated segment value is identified as found or the remaining segment values in the initial segmentation have all been concatenated;

if the first remaining segment value or the concatenated segment value are identified as found, removing them from the initial segmentation; and repeating the steps of validating, generating a concatenated segment value and removing, until there are no more remaining segment values in the initial segmentation.

Example 16 is the computer readable storage medium of any or all previous examples and further comprising:

segmenting the string of characters into the initial segmentation comprising segments with corresponding segment values based on a set of separator characters in the string of characters.

Example 17 is the computer readable storage medium of any or all previous examples and further comprising:

displaying a data entry user input mechanism in a business system; and receiving the string of characters with the set of separator characters through the data entry user input mechanism.

Example 18 is the computer system of any or all previous examples wherein segmenting the string of characters into the initial segmentation comprises:

dividing the string of characters into a plurality of segments at segment boundaries identified by the separator characters in the string of characters.

Example 19 is the computer readable storage medium of any or all previous examples wherein validating comprises:

accessing a business system data store to identify whether the first remaining segment value or concatenated segment value is found or unfound in the business system data store.

Example 20 is the computer readable storage medium of any or all previous examples and further comprising:

outputting a final segmentation value having segments comprising any combination of segments in the initial segmentation value and concatenated segment values generated by the steps of validating, generating a concatenated segment value and removing, when there are no more remaining segment values in the initial segmentation, and marking the segments in the final segmentation value as found or unfound.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   receiving data entry inputs of a string of characters that includes at least one separator character;
   segmenting a string of characters into an initial segmentation of segments with corresponding segment values based on the at least one separator character;
   selecting a first segment in the initial segmentation;
   validating a first segment value in the initial segmentation to identify it as found or unfound;
   if the first segment value is identified as unfound;
      determining whether any more segments in the initial segmentation have yet processed;
      if more segment(s) in the initial segmentation have yet to be processed, appending a next separator character and a next segment of the initial segmentation to the first segment and thus generating a concatenated segment value, and then returning to the validating step;
      if no more segment(s) in the initial segmentation have yet to be processed, outputting only the first segment as a non-found segment and removing only the first segment from the initial segmentation, then determining whether one or more segments in the initial segmentation have yet to be processed;
         if more segment(s) in the initial segmentation have yet to be processed, returning to the selecting step;
         if no more segment(s) in the initial segmentation have yet to be processed, generating a final segmentation list and outputting the final segmentation list;
   if the segment value or the concatenated segment value is identified as found:
      outputting the first segment value or the concatenated segment value as a found segment and then removing the found segment from the initial segmentation;
      determining whether one or more segments in the initial segmentation have yet to be processed;
         if more segment(s) have yet to be processed, returning to the selecting step;
         if no more segment(s) have yet to be processed, generating a final segmentation list and outputting the final segmentation list.

2. The computer implemented method of claim 1 and further comprising:
   generating an output segmentation indicating a segment structure of output segments and corresponding segment values; and
   indicating whether any segment values in the output segmentation are unfound.

3. The computer implemented method of claim 2 and further comprising:
   receiving a revised segmentation in which a segment in the output segmentation has been modified; and
   validating only segments in the revised segmentation that are subsequent to the modified segment in the output segmentation, to obtain a final segmentation.

4. The computer implemented method of claim 1 and further comprising:
   generating a data entry user input mechanism in a business system; and
   receiving the string of characters input through the data entry user input mechanism.

5. The computer implemented method of claim 4 wherein segmenting the string of characters into the initial segmentation comprises:
   dividing the string of characters into a plurality of segments at segment boundaries identified by the at least one separator character in the string of characters.

6. The computer implemented method of claim 5 wherein determining whether a segment value is found comprises:
   looking up the segment value in a business system data store to identify whether the segment value is found or unfound in the business system data store.

7. The computer-implemented method of claim 1 and further comprising:
   marking the segments in the final segmentation list as found or unfound.

8. The computer-implemented method of claim 1, wherein the first segment value is one or more characters that comprise the first segment, and wherein the second segment value is one or more characters that comprise the second segment.

9. The computer-implemented method of claim 1, wherein the at least one separator character comprises a plurality of separator characters.

10. The computer-implemented method of claim 1, wherein the at least one separator character is a hyphen.

* * * * *